United States Patent [19]
Jacob

[11] 4,031,401
[45] June 21, 1977

[54] RADIANT ENERGY IMAGING SCANNING

[75] Inventor: Daniel Jacob, Allston, Mass.

[73] Assignee: American Science & Engineering, Inc., Cambridge, Mass.

[22] Filed: Mar. 14, 1975

[21] Appl. No.: 558,426

[52] U.S. Cl. .............................. 250/503; 250/514; 250/363 S

[51] Int. Cl.² ......................................... G01J 1/00

[58] Field of Search .......... 250/505, 509, 503, 416, 250/363 S, 514

[56] References Cited
UNITED STATES PATENTS

| | | | |
|---|---|---|---|
| 2,825,817 | 3/1958 | North | 250/503 |
| 3,229,089 | 1/1966 | Sasao | 250/416 |
| 3,780,291 | 12/1973 | Stein | 250/416 |
| 3,790,799 | 2/1974 | Stein et al. | 250/416 |

Primary Examiner—Alfred E. Smith
Assistant Examiner—B. C. Anderson
Attorney, Agent, or Firm—Charles Hieken; Jerry Cohen

[57] ABSTRACT

A tilted drum having an X-ray opaque rim formed with slits parallel to the drum axis has a rim portion interposed between an X-ray tube and an X-ray opaque stationary surface formed with a slit perpendicular to the drum axis to provide a scanning pencil beam of X-rays of rectangular cross section as the drum rotates about its axis.

5 Claims, 2 Drawing Figures

RADIANT ENERGY IMAGING SCANNING

BACKGROUND OF THE INVENTION

The present invention relates in general to radiant energy imaging and more particularly concerns novel apparatus and techniques for providing a scanning rectangular pencil beam of radiant energy with a relatively compact shielded structure requiring a relatively small area of radiant energy opaque material in the moving element. The invention is especially useful in X-ray systems of the type described in U.S. Pat. No. 3,780,291 embodied in the American Science & Engineering, Inc. Micro-Dose systems used by leading airlines and others for the rapid safe inspection of baggage and parcels for concealed items.

It is an important object of the invention to provide an improved source of a scanning radiant energy beam that may not be focused with conventional lenses according to the laws of geometrical optics.

It is another object of the invention to achieve the preceding object while providing a pencil of rectangular cross section.

It is a further object of the invention to achieve one or more of the preceding objects with a structure that is relatively compact and uses relatively little material that is opaque to radiant energy of the type that may not be focused with conventional lenses according to the laws of geometric optics.

It is still a further object of the invention to achieve one or more of the preceding objects in connection with an X-ray scanning system.

SUMMARY OF THE INVENTION

According to the invention, there is a source of radiant energy of the type that may not be focused by convention lenses in accordance with the laws of geometrical optics, such as X-ray or gamma ray radiant energy, a fixed surface of material opaque to the radiant energy formed with an exit slit, an annular rim of material opaque to the radiant energy formed with at least one slit generally perpendicular to the length of the slit in the stationary surface, means for rotating the rim about its axis so that the projection of the rim slit upon the stationary surface slit moves from one end of the stationary slit to the other as the annular rim rotates to provide a scanning pencil beam of radiant energy from a source illuminating the annular rim.

Numerous other features, objects and advantages of the invention will become apparent from the following specification when read in connection with the accompanying drawing in which:

DETAILED DESCRIPTION OF PREFERRED EMBODIMENTS

Figure 1:
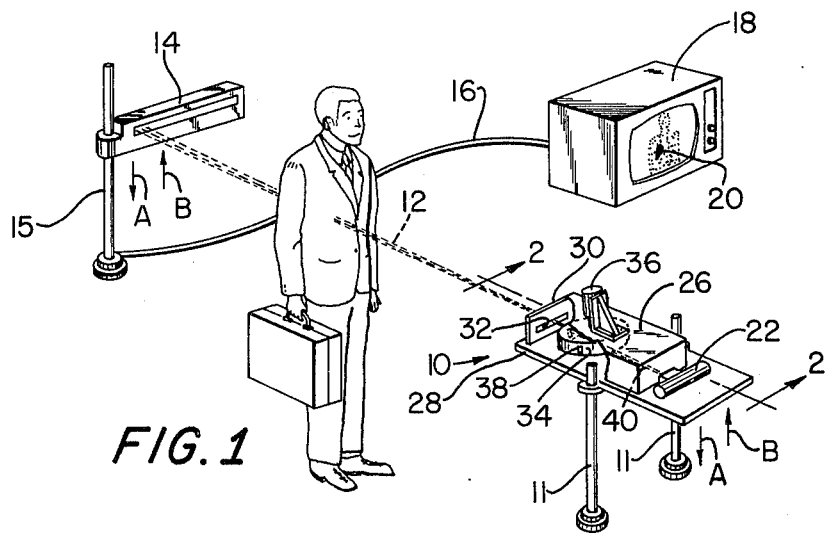
FIG. 1. is a pictorial representation of a system incorporating the invention for inspecting people.

With reference now to the drawing and more particularly FIG. 1 thereof, there is shown a pictorial representation of a system incorporating the invention for personnel inspection. Apparatus 10 for providing a scanning pencil beam 12 is mounted on a supporting guide, such as tracks or rails 11, and displaceable vertically as indicated by arrows A and B. Alternatively, the apparatus may be rocked rather than vertically displaced as shown in U.S. Pat. No. 3,790,799.

Pencil beam 12 scans horizontally the person inspected and elongated radiation sensitive detector 14, which is mounted on one or more rails 15, to provide an image signal transmitted by output cable 16 to video storage and display unit 18 to produce the image 20 of the inspected subject and any contraband on his person as the apparatus 10 and detector 14 move vertically while remaining in the same horizontal plane.

Figure 2:
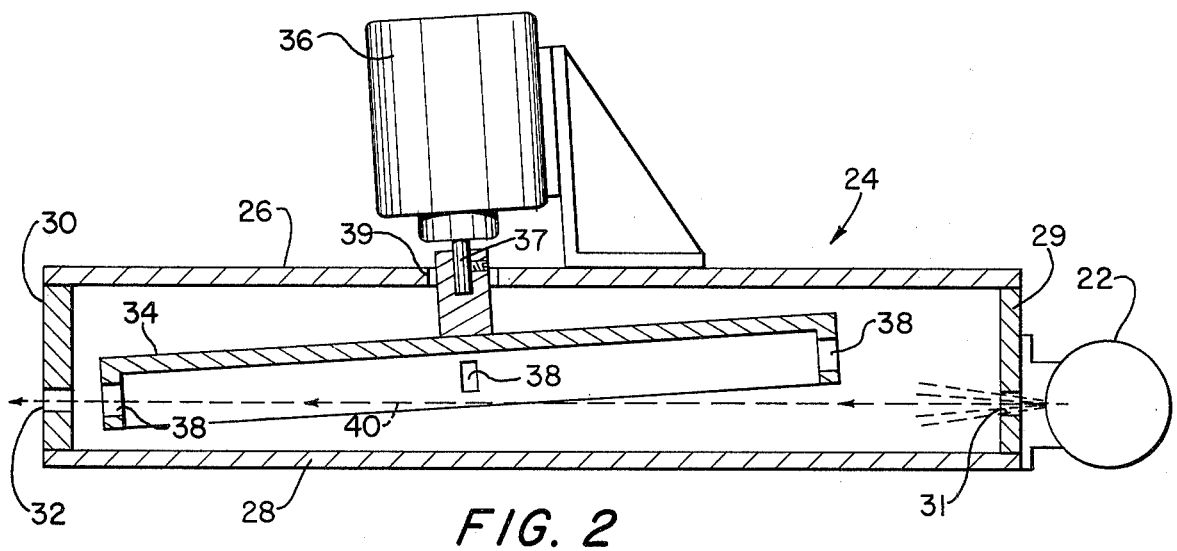
FIG. 2 is a sectional view of an exemplary embodiment of the invention through section 2—2 of FIG. 1.

With reference now also to FIG. 2, there is shown a sectional view of an embodiment of the invention through section 2—2 of FIG. 1. In FIG. 1 there is a cutaway view of apparatus 10 to better illustrate features of the invention. Apparatus 10 comprises a radiant energy emitter, such an an X-ray tube 22, emitting its radiant energy into and through a shallow enclosure 24 comprising an upper wall 26, a lower wall 28, an exit wall 30 containing an elongated exit slit 32 and an entrance wall 29 having an entrance slit 31.

Enclosure 24 houses rotatable chopper wheel 34 of inverted cake pan shape having a depending rim formed with slits 38 parallel to the wheel axis which is tilted from the vertical toward exit slit 32 so that only an inside portion of the rim is in the line between the radiant energy 40 from source 22 that passes through entrance slit 31 and exit slit 32 while the diametrically opposite portion is offset from that line, source 22 being spaced from exit slit 32 by a distance greater than the diameter of the annular rim of chopper wheel 34. Slits 38 are generally perpendicular to the length of exit slit 32. Upper wall 26 supports motor 36 which carries and rotates, through a shaft 37 and a bub passing through an aperture 39 in the upper wall 26, chopper wheel 34 to produce the horizontal scanning of beam 12.

The invention has a number of features. Because slits 38 and 32 are orthogonal, pencil beam 12 is essentially of rectangular cross section to enhance resolution. Only the relatively small area of the rim of chopper wheel 34 need be made of material opaque to the X-ray energy. The walls of enclosure 24 are made of material opaque to the X-ray energy; however, the compact volume of this enclosure requires relatively little of this material to provide a relatively compact lightweight shielded enclosure.

X-ray tube 22 emits a generally conical beam through entrance slit 31 in entrance wall 29 that slits 38 and 32 form into a pencil beam of rectangular shape. The separation between slits 38 is preferably slightly greater than the length of exit slit 32 so that as the projection of one slit 38 leaves slit 32, the next one enters. Typical dimensions for slit 32 is 2 mm by 30 cm and for slit 38 10 by 1 mm.

There has been described novel apparatus and techniques for providing a rectangular scanning pencil beam of radiant energy of a type that may not be focused by conventional lenses in accordance with principles of geometrical optics. The specfic embodiments described herein are by way of example only. For example, the rim of chopper wheel 34 could be supported by spokes instead of a solid disc, thereby reducing its moment of inertia. Numerous other modifications of an departures from the specific embodiments described herein may be practiced by those skilled in the art without departing from the inventive concepts. Consequently, the invention is to be construed as embracing each and every novel feature and novel combination of features present in, or possessed by the apparatus and techniques herein disclosed and limited solely by the spirit and scope of the appended claims.

What is claimed is:

1. Radiant energy image scanning apparatus comprising,
    a source of radiant energy that may not be focused by conventional lenses in accordance with the principles of geometric optics,
    first means opaque to said radiant energy formed with an exit slit for providing therefrom a pencil beam of radiant energy that scans along the length of said slit.
    second means opaque to said radiant energy in the form of an annular rim formed with at least one slit that is generally parallel to the rim axis and generally perpendicular to the length of said exit slit.
    and means for rotatably supporting said second means for rotation about said axis with the projection of the at least one slit therein traversing said exit slit as said annular rim rotates oriented so that one surface of said annular rim intercepts said radiant energy while the portion of the annular rim diametrically opposite the intercepting portion is offset from a line joining said source and said exit slit whereby said slit in said second means transmits said radiant energy to said exit slit as said second means is angularly displaced about its axis to coact with said exit slit to provide said scanning pencil beam,
    said source of radiant energy being outside said annular rim and spaced from said exit slit by a distance greater than the diameter of said annular rim.

2. Apparatus in accordance with claim 1 and further comprising enclosure means including said first means that is opaque to said radiant energy for enclosing said second means including an entrance face formed with an entrance slit through which radiant energy from said source enters so that said line is between the entrance and exit slits and passes through said intercepting portion of said rim.

3. Radiant energy imaging scanning apparatus in accordance with claim 1 wherein said source of radiant energy comprises an X-ray source.

4. Radiant energy imaging scanning apparatus in accordance with claim 1 wherein said axis is tilted slightly toward said exit slit from a line perpendicular to said line joining said source of radiant energy and said exit slit.

5. Radiant energy imaging scanning apparatus in accordance with claim 4 wherein said first means opaque to said radiant energy comprises a housing of X-ray opaque material having opposed top and bottom panels, opposed side panels and opposed entrance and exit panels having said exit slit in said exit panel and having an entrance slit facing said exit slit formed in said entrance panel.
    said radiant energy source comprising an X-ray tube attached to said entrance panel for illuminating said entrance slit with X-ray energy,
    said second means opaque to said radiant energy comprising a member of inverted cake pan form having said annular rim, excluding said at least one slit, opaque to X-rays within said housing,
    said means for rotatably supporting comprising a motor supported on said top panel having a shaft connected to said second means opaque to said radiant energy along the axis of the latter,
    the height of said annular rim being less than its diameter,
    the height of said enclosure being less than the distance between said entrance panel and said exit panel.

* * * * *